Figure 1:
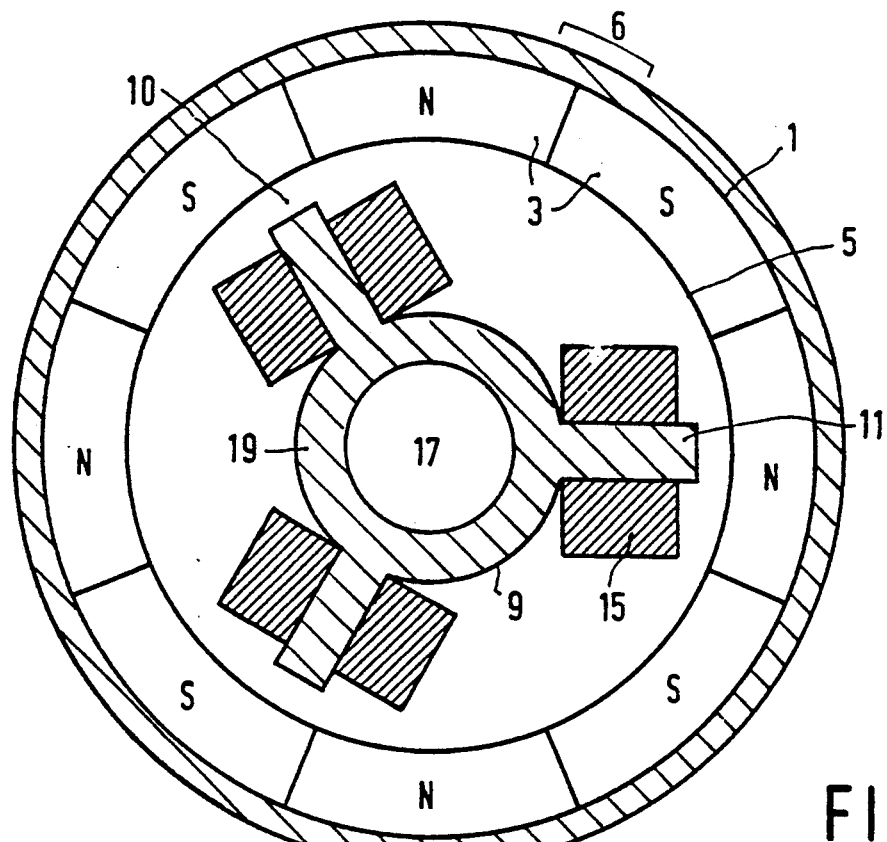

United States Patent [19]
Ackermann

[11] Patent Number: 5,099,165
[45] Date of Patent: Mar. 24, 1992

[54] BRUSHLESS D.C. MOTOR

[75] Inventor: Bernd Ackermann, Aachen, Fed. Rep. of Germany

[73] Assignee: U.S. Philips Corporation, New York, N.Y.

[21] Appl. No.: 629,518

[22] Filed: Dec. 18, 1990

[30] Foreign Application Priority Data

Dec. 18, 1989 [DE] Fed. Rep. of Germany ....... 3941709

[51] Int. Cl.$^5$ ............................................. H02K 1/24
[52] U.S. Cl. .................... 310/269; 310/156; 310/185
[58] Field of Search ............ 310/67 R, 156, 154, 310/269, 261, 40 MM, 177, 46, 254, 185, 181

[56]  References Cited
U.S. PATENT DOCUMENTS 3,860,843  1/1975  Kawasaki ............................ 310/156
4,217,508  8/1980  Uzuka .................................. 310/46
4,280,072  7/1981  Gotou ............................. 310/67 R
4,698,538  10/1987  Yoshida ............................ 310/177
4,728,833  3/1988  Shiraki ........................... 310/67 R

FOREIGN PATENT DOCUMENTS 7310863  3/1973  Fed. Rep. of Germany .
2823208  8/1984  Fed. Rep. of Germany .
0117568  9/1981  Japan .

Primary Examiner—R. Skudy

[57]  ABSTRACT

A brushless d.c. motor having a number of permanent magnetic pole pairs and a number of salient poles wherein the ratio between the number of permanent magnetic pole pairs and the number of salient poles is greater than unity but less than 2:1 and the ratio between the widths of the salient poles and the widths of the permanent magnetic pole pairs is greater than 0.2 but not greater than 1.2.

3 Claims, 1 Drawing Sheet

BRUSHLESS D.C. MOTOR

The invention relates to a brushless dc motor comprising a first motor section, which exhibits circumferentially alternating permanent-magnetic north and south poles, one north pole and one south pole each time forming a permanent-magnetic pole pair, and comprising a second motor section having electrically energizable salient poles.

Such motors are known, for example from DE-GmS 73 10 863. A problem with such motors is that they exhibit a so-called detent torque, which leads to undesirable mechanical vibrations, noises and speed fluctuations. It is known that the fundamental frequency of the detent torque is given by the product of the mechanical rotational frequency of the motor and the least common multiple of the number of permanent-magnetic poles of one motor section and the number of salient poles of the other motor section. In order to reduce the detent torque it is desirable to make its fundamental frequency as large as possible because the amplitude of the detent torque decreases with the fundamental frequency, and the inertial moment provides a better compensation for the effect of torque fluctuations as the frequency is higher.

From DE-PS 28 23 208 it is known to reduce the detent torque in that the pole shoes of the salient poles a are formed with indentations in such way that each of them has a magnetic effect comparable to that of each of the spaced pole gaps. The number of indentations should be at least equal to the number of pole gaps and the indentations should be oriented at an angle relative to the corresponding pole gaps in the pole shoes which is unequal to an integral multiple of the pole pitch. The indentations divide each individual salient pole into a plurality of salient subpoles, thereby increasing the number of salient poles involved in producing the detent torque. With respect to the linkage of the magnetic field produced by the permanent-magnetic poles with the coils which serve to provide the electrical excitation of the salient poles, each of the originally existing salient poles collects the flux of several salient subpoles and, in particular, also the corresponding stray flux components.

A problem arising with small motors is that the steps outlined above cannot adequately reduce the return torque because for constructional reasons the number of salient poles cannot be increased arbitrarily and it is difficult to form indentations on small pole shoes.

It is an object of the invention to provide a further reduction of the detent torque of brushless d.c. motors.

According to the invention this object is achieved in that the salient poles of the second motor section are free of indentations at the location of the air gap, the ratio between the number of permanent-magnetic pole pairs of the first motor section and the number of salient poles of the second motor section is greater than unity, measured in mechanical angular degrees the ratio between the width of the salient poles of the second motor section and the width of the poles of the first motor section at the location of the air gap is greater than 0.2 but not greater than 1.2.

In small motors it is favourable for constructional reasons not to provide the salient poles with indentations.

If the ratio between the number of permanent-magnetic pole pairs of the first motor section and the number of salient poles of the second motor section is greater than unity, this also enables a high fundamental frequency of the detent torque to be obtained when the number of salient poles of the second motor section is small for constructional reasons. The large number of permanent-magnetic pole pairs of the first motor section necessary for this purpose can then be realized readily by a correspondingly magnetized permanent magnet.

If in addition the ratio between the width of the salient poles and the width of the poles of the permanent-magnetic pole pairs is greater than 0.2 but not greater than 1.2 the linkage of the magnetic field excited by the permanent-magnetic poles with the salient poles will be optimal and the detent torque will be minimal.

In a further embodiment of the invention the ratio between the number of permanent-magnetic pole pairs and the number of salient poles is 4:3, the ratio between the width of a salient pole at the location of the air gap and the width of one of the permanent-magnetically excited poles being 0.26. By means of a minimal number of teeth this yields a motor with a small detent torque which can be provided with a three-phase winding.

In a further embodiment of the invention the ratio between the number of permanent-magnetic pole pairs and the number of salient poles is 5:4, the ratio between the width of a salient pole at location of the air gap and the width of one of the permanent-magnetically excited poles being unity. By means of a minimal number of teeth this yields a motor with a small detent torque which may be provided with a two-phase winding.

The invention will now be described in more detail, by way of example, with reference to the drawing. In the drawing FIG. 1 is a sectional view showing a brushless d.c. motor in accordance with the invention, comprising eight permanent-magnetic poles in the external rotor and three excitable salient poles in the stator, and FIG. 2 is a sectional view of the motor comprising ten permanent-magnetic poles and four salient poles.

Figure 2:
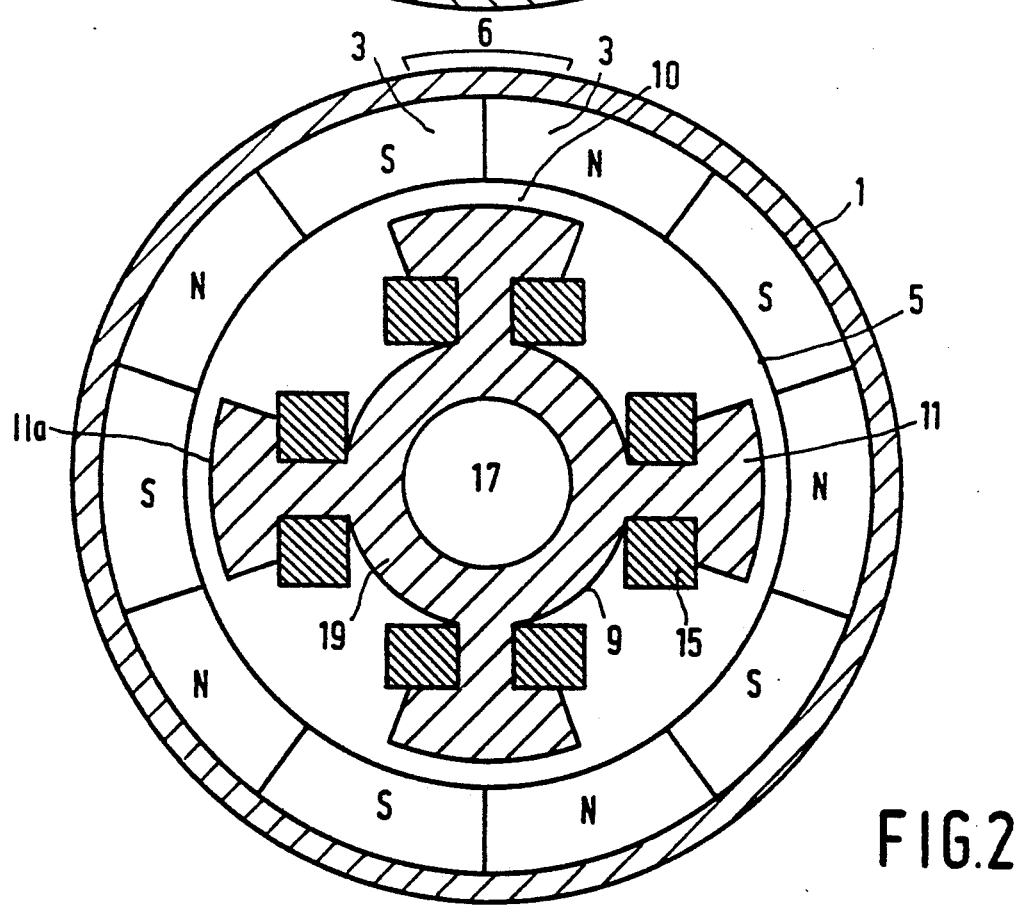

FIGS. 1 and 2 show a brushless d.c. motor shown in a diagrammatic sectional view. The motor comprises a first motor section 1 with circumferentially alternating permanent-magnetically excited north and south pole pieces 3 arranged in an iron yoke surrounding them. The north and south pole pieces 3 form north poles N and south poles S on the inner wall 5 of the motor section 1. Two circumferentially adjacent permanent-magnetic pole pieces 3 each time constitute a pole pair 6. The first motor section 1 is, for example, rotatable about a stationary second motor section 9. This stationary second motor section 9 comprises salient magnetic poles 11. These poles 11 can be electrically excited by means of coils 15. All air gap 10 is formed between magnetic pole pieces 3 and salient poles 11 the electrically excitable poles 11 around the motor shaft 17 are magnetically coupled by means of iron return members 19.

FIG. 1 shows a motor version comprising eight permanent-magnetically excited pole pieces 3 and three salient poles 11. Consequently, the ratio between the number of permanent-magnetic pole pairs 6 and the number of salient poles 11 is 4:3 which is less than 2:1. The ratio between the width of one salient pole 11 and the width of one of the permanent-magnetically excited poles 3 as air gap 10 is now selected to be approximately 0.26.

FIG. 2 shows a motor comprising ten permanent-magnetically excited pole pieces 3 and four salient poles 11 separated by air gap 10. Consequently, the ratio between the number of permanent-magnetic pole pairs 6 and the number of salient poles 11 is 5:4 which is less than 2:1. The ratio between the width of one salient pole 11 and the width of one permanent-magnetically excited pole 3 is now selected to be approximately unity by the use of pole shoes 11a on the salient poles 11.

I claim:

1. A brushless d.c. motor comprising a first motor section and a second motor section which are rotatable with regard to each other, the first motor section including a number of permanent magnetic pole pairs formed by circumferentially alternating permanent magnetic north and south poles adjacent a magnetic air gap, each permanent magnetic pole pair including one north pole and one south pole, said second motor section having a number of electrically energizable salient poles, the salient poles being free of indentations at a location of said air gap, the number of permanent magnetic pole pairs and the number of salient poles constituting a ratio which is greater than unity but less than 2:1, said permanent magnetic north and south poles and said salient poles having widths at the air gap which with respect to each other form a ratio which is between 0.2 and 1.2.

2. A brushless d.c. motor as claimed in claim 1 wherein the ratio between the number of permanent magnetic pole pairs and the number of salient poles is 4.3 and the ratio at said air gap between the width of a salient pole and the width of a permanent magnetic pole is 0.26.

3. A brushless d.c. motor as defined in claim 1 wherein the ratio between the number of permanent magnetic pole pairs and the number of salient poles is 5.4 and the ratio at said air gap between the width of a salient pole and the width of a permanent magnetic pole is unity.

* * * * *